United States Patent
Emoto

(10) Patent No.: US 6,432,333 B1
(45) Date of Patent: Aug. 13, 2002

(54) NOZZLE TOUCH APPARATUS FOR INJECTION MOLDING MACHINE

(75) Inventor: Atsushi Emoto, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/386,447

(22) Filed: Aug. 31, 1999

(30) Foreign Application Priority Data

Sep. 1, 1998 (JP) .......................... 10-247274

(51) Int. Cl.[7] .......................... B29C 45/07; B29C 45/80
(52) U.S. Cl. .................. 264/40.5; 264/328.11; 425/135; 425/569; 425/574
(58) Field of Search ............................. 264/40.5, 328.1, 264/328.11; 425/135, 574, 569, 567

(56) References Cited

U.S. PATENT DOCUMENTS

| 4,299,791 A | | 11/1981 | Aoki | |
|---|---|---|---|---|
| 4,676,730 A | * | 6/1987 | Yamasaki | 425/569 |
| 4,950,144 A | * | 8/1990 | Watanabe et al. | 425/569 |
| 5,147,659 A | * | 9/1992 | Watanabe et al. | 425/574 |
| 5,804,224 A | * | 9/1998 | Inaba et al. | 425/574 |
| 6,077,064 A | * | 6/2000 | Graetz et al. | 264/328.1 |

FOREIGN PATENT DOCUMENTS

EP          0 422 224 A1    4/1991

* cited by examiner

Primary Examiner—Jill L. Heitbrink
(74) Attorney, Agent, or Firm—Arent Fox Kintner Plotkin & Kahn

(57) ABSTRACT

An injection apparatus is disposed to be movable relative to the frame. A driver advances and retracts the injection apparatus. An energy absorption element is disposed between the driver and the frame and adapted to absorb mechanical energy relating to the nozzle touch force. A buffer member may also be disposed between the injection apparatus and the driver. In this case, variation in nozzle touch force due to overload can be adjusted by the action of the buffer member. Accordingly, when the buffer member is adjusted so as to reduce the variation in nozzle touch force due to overload, an excessively large nozzle touch force is not generated, so that breakage of the mold apparatus and the nozzle can be prevented. Further, resin is prevented from leaking from any clearance between the injection nozzle and the molding apparatus.

22 Claims, 4 Drawing Sheets

PRESSURE SOURCE (ACCUMULATOR)

NOZZLE TOUCH APPARATUS FOR INJECTION MOLDING MACHINE

BACKGROUND OF THE INVENTION

1. Field of the Invention

The present invention relates to a nozzle touch apparatus for an injection molding machine.

2. Description of the Related Art

Conventionally, an injection molding machine comprises an injection apparatus and a mold apparatus. The injection apparatus is constructed such that resin heated and melted in a heating cylinder is injected from an injection nozzle. The injected resin is charged into a cavity of the mold apparatus. The molten resin is then cooled and solidified, and the mold apparatus is opened so as to permit removal of a molded article from the mold apparatus.

FIG. 1 is a conceptual diagram of a conventional injection molding machine, and FIG. 2 is a nozzle touch characteristic chart of the conventional injection molding machine. In FIG. 2, the horizontal axis represents an amount of deformation x, and the vertical axis represents a nozzle touch force f.

In FIG. 1, numeral 10 denotes an injection apparatus, numeral 11 denotes a heating cylinder, and numeral 13 denotes an injection nozzle provided at the front end (the left end in FIG. 1) of the heating cylinder 11. An unillustrated screw is disposed within the heating cylinder 11 such that the screw can be rotated and can be advanced and retracted by a drive section 12.

The screw extends rearwardly (rightward in FIG. 1) within the heating cylinder 11, and the rear end (the right end in FIG. 1) of the screw is connected to the drive section 12. The screw has a screw head at the front end thereof and a spiral flute formed on the peripheral surface of a metering portion of the screw, so that the flute defines a groove.

In the injection apparatus 10 having the above-described structure, during a metering stage, the drive section 12 is driven in order to retract the screw (rightward in FIG. 1), while rotating the screw in a forward direction. Consequently, pellet-shaped resin within an unillustrated hopper flows into the heating cylinder 11, and is caused to advance (move leftward in FIG. 1) along the groove of the screw. At this time, the resin is heated and melted by an unillustrated heater and accumulated on the front side of the screw head.

Further, during an injection stage, the drive section 12 is driven in order to advance the screw, so that the resin accumulated at the front side of the screw head is injected from the injection nozzle 13 and is charged into an unillustrated cavity of a mold apparatus 14. The mold apparatus 14 is composed of a stationary mold 15 and a movable mold 16. The movable mold 16 is advanced and retracted by an unillustrated mold clamping apparatus in order to bring the movable mold 16 into contact with the stationary mold 15 and separate the movable mold 16 from the stationary mold 15. Thus, mold closing, mold clamping, and mold opening are performed.

Subsequently, when the charging of resin into the cavity is completed, cooling water is caused to flow through an unillustrated cooling passage formed within the molding apparatus 14, so that the resin is cooled. After the resin is solidified, the molding apparatus is opened so as to permit removal of a molded product.

In the injection molding machine, resin may leak from a clearance between the injection nozzle 13 and the stationary mold 15 while the resin is being charge into the cavity, unless the injection nozzle 13 is in contact with the stationary mold 15 with a predetermined pressing force or nozzle touch force.

In order to solve the above-described drawback, a nozzle touch apparatus is provided. The nozzle touch apparatus advances the injection apparatus 10 such that the injection nozzle 13 comes in contact with the stationary mold 15 with a predetermined nozzle touch force. Thus, a nozzle touch operation is completed.

In order to perform the nozzle touch operation, a support member 22 and a motor 25 serving as drive means are fixed to a frame 21 of the injection molding machine; a ball screw shaft 23 is rotatably supported by the support member 22; and a ball nut 24 is in screw-engagement with the ball screw shaft 23. Further, the ball screw shaft 23 is connected to an output shaft 25a of the motor 25, and the ball nut 24 is connected to the injection apparatus 10 via a spring 26. A sensor 28 is disposed to face the spring 26. The sensor 28 senses a displacement of a certain portion of the spring 26 due to deformation of the spring 26 (hereinafter referred to as a "deforming position") to thereby detect an amount of deformation.

In this case, when the ball screw shaft 23 is rotated through drive of the motor 25, the ball nut 24 is advanced from a retracted position, so that the injection apparatus 10 is advanced. Thus, the injection apparatus 10 reaches a nozzle touch position, and the injection nozzle 13 comes into contact with the stationary mold 15. Subsequently, when the motor 25 is further driven in a state in which the injection nozzle 13 is in contact with the stationary mold 15, the ball nut 24 is advanced against the urging force of the spring 26, so that the spring 26 contracts by an amount corresponding to the distance advanced by the ball nut 24. At this time, the injection nozzle 13 presses the stationary mold 15 with a force corresponding to the amount of deformation of the spring 26. When the deformation amount of the spring 26 is represented by x, and a pressing force that the injection nozzle 13 exerts on the stationary mold 15 or a nozzle touch force is represented by f, a relationship as shown in FIG. 2 exists between the deformation amount x and the nozzle touch force f. Accordingly, the nozzle touch force f can be detected through detection of the deforming position of the spring 26. When the deformation amount x reaches a preset value x1 and thus a proper nozzle touch force f equal to a target nozzle touch force f1 is generated, the motor 25 is stopped.

In the nozzle touch apparatus of the conventional injection molding machine, the injection apparatus 10 is connected to the ball nut 24 via the spring 26. Therefore, if an external force is applied to the injection apparatus 10 due to impact caused by, for example, closing or opening of the molding apparatus 14 or injection of resin, the spring 26 is expanded or contracted, so that the deformation amount x varies.

Therefore, even when the ball nut 24 is accurately positioned, the sensor 28 may erroneously detect the deformation amount x due to expansion or contraction of the spring 26 caused by an external force. In this case, the nozzle touch force f is not accurately detected, with the result that a proper nozzle touch force f equal to the target nozzle touch force f1 cannot be generated. For example, when the spring 26 is contracted, the nozzle touch force f becomes excessively large, resulting in breakage of the mold apparatus 14 and/or nozzle 13. When the spring 26 is expanded, the nozzle touch force f becomes excessively small, resulting in resin leaking from the clearance between the injection nozzle 13 and the stationary mold 15.

Since the spring 26 and the sensor 28 are attached to the injection apparatus 10, the spring 26 and the sensor 28 are accommodated within an unillustrated casing of the injection apparatus 10, which deteriorates ease of maintenance and management of the injection molding machine.

SUMMARY OF THE INVENTION

An object of the present invention is to solve the above-mentioned problems in the conventional nozzle touch apparatus for an injection molding machine, to provide a nozzle touch apparatus for an injection molding machine which can accurately detect nozzle touch force, which can generate a proper nozzle touch force, and/or which facilitates work for maintenance and management of the injection molding machine.

A nozzle touch apparatus for an injection molding machine according to one example of the present invention comprises: a frame; an injection apparatus having an injection nozzle, said injection apparatus being disposed to be movable relative to said frame, moving means for moving said injection nozzle of said injection apparatus towards and away from a mold, said injection nozzle thus being movable to abut said mold with a nozzle touch force, and first energy absorption means disposed between said moving means and said frame for absorbing mechanical energy relating to the nozzle touch force.

Other aspects of the invention and their advantages will become apparent with reference to the following description of one detailed example of the invention.

BRIEF DESCRIPTION OF THE DRAWINGS

The structure and features of the detailed example of a nozzle touch apparatus for an injection molding machine according to the present invention will be more readily appreciated as the same becomes better understood by reference to the accompanying drawings, in which.

DESCRIPTION OF PREFERRED EMBODIMENT

An embodiment of the present invention will next be described in detail with reference to the drawings.

Figure 1:
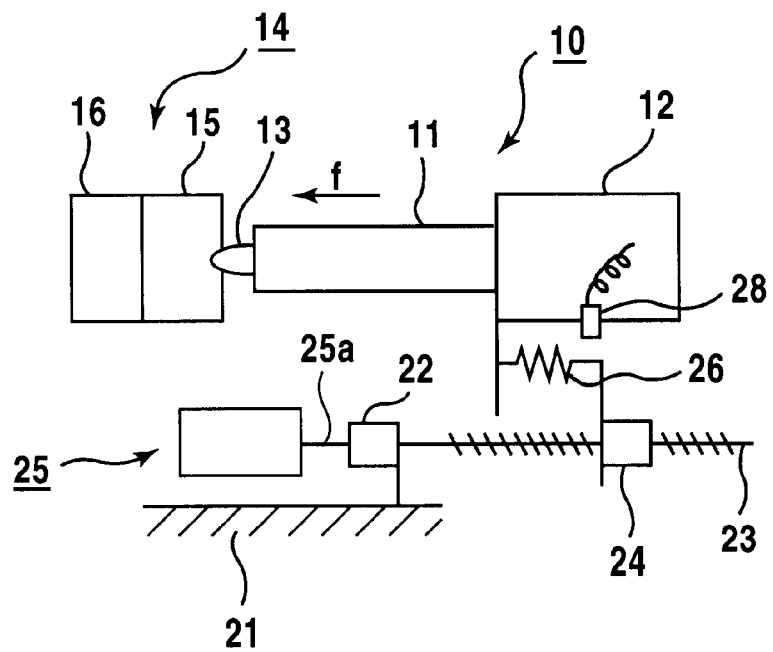
FIG. 1 is a conceptual diagram of a conventional injection molding machine.
Figure 2:
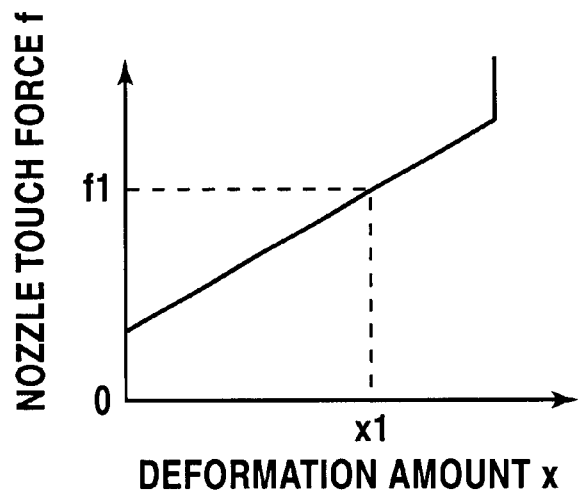
FIG. 2 is a nozzle touch characteristic chart of the conventional injection molding machine.
Figure 3:
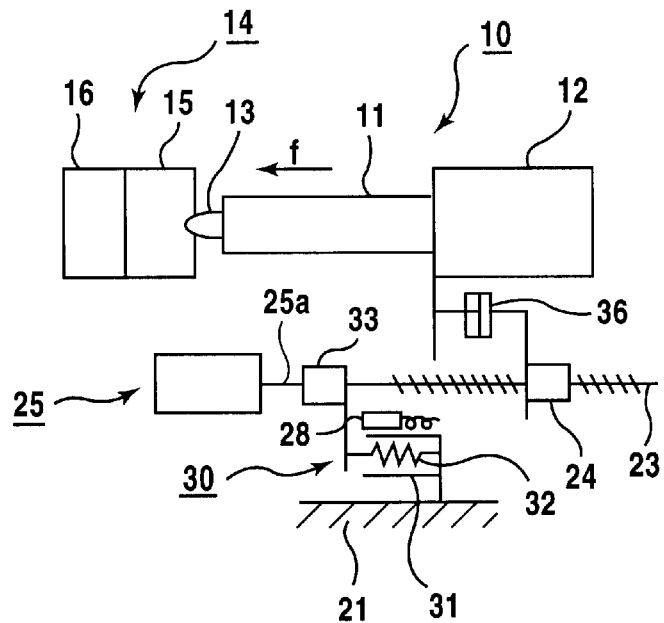
FIG. 3 is a conceptual diagram of a detailed example of an injection molding machine according to an embodiment of the present invention.

FIG. 3 is a conceptual diagram of one example of an injection molding machine according to an embodiment of the present invention.

In FIG. 3, numeral 10 denotes an injection apparatus which is disposed to be movable relative to a frame 21 of the injection molding machine; numeral 11 denotes a heating cylinder (cylinder member); numeral 13 denotes an injection nozzle provided at the front end (the left end in FIG. 3) of the heating cylinder 11; and numeral 25 denotes a motor (drive means) for advancing and retracting (leftward and rightward in FIG. 3) the injection apparatus 10.

An unillustrated screw (injection member) is disposed within the heating cylinder 11 such that the screw can be rotated and can be advanced and retracted by a drive section 12.

The screw extends rearward (rightward in FIG. 3) within the heating cylinder 11, and the rear end (the right end in FIG. 3) of the screw is connected to the drive section 12. The screw has a screw head at the front end thereof and a spiral flute is formed on the peripheral surface of a metering portion of the screw, so that a groove is formed along the flute.

In the injection apparatus 10 having the above-described structure, during a metering stage, the drive section 12 is driven in order to retract the screw (rightward in FIG. 3), while rotating the screw in a forward direction. Consequently, pellet-shaped resin within an unillustrated hopper flows into the heating cylinder 11, and is caused to advance (move leftward in FIG. 3) along the groove. At this time, the resin is heated and melted by an unillustrated heater and accumulated on the front side of the screw head.

Further, during an injection stage, the drive section 12 is driven in order to advance the screw, so that the resin accumulated at the front side of the screw head is injected from the injection nozzle 13 and is charged into an unillustrated cavity of a mold apparatus 14. The mold apparatus 14 is composed of a stationary mold 15 and a movable mold 16. The movable mold 16 is advanced and retracted by an unillustrated mold clamping apparatus in order to bring the movable mold 16 into contact with the stationary mold 15 and separate the movable mold 16 from the stationary mold 15. Thus, mold closing, mold clamping, and mold opening are performed.

Subsequently, when the charging of resin into the cavity is completed, cooling water is caused to flow through an unillustrated cooling passage formed within the molding apparatus 14, so that the resin is cooled. After the resin is solidified, the molding apparatus is opened so as to permit removal of a molded product.

In the injection molding machine, resin may leak from a clearance between the injection nozzle 13 and the stationary mold 15 while the resin is being charge into the cavity, unless the injection nozzle 13 is in contact with the stationary mold 15 with a predetermined nozzle touch force.

In order to solve the above-described drawback, the nozzle touch apparatus advances the injection apparatus 10 such that the injection nozzle 13 comes in contact with the stationary mold 15 with the predetermined nozzle touch force. Thus, a nozzle touch operation is completed.

In order to perform the nozzle touch operation, the nozzle touch apparatus has the following structure. A support unit 30 is disposed on the frame 21. The support unit 30 includes a tubular holding member 31 fixed to the frame 21, a spring 32 whose rear end is fixed to the holding member 31, and a support member 33 fixed to the front end of the spring 32. The holding member 31 restricts expansion and contraction of the spring 32. The holding member 31 and the spring 32 are disposed between the frame 21, and a ball screw shaft 23 and a ball nut 24 and serve as accumulation means for accumulating nozzle touch force f.

The support member 33 is provided with an unillustrated bearing and rotatably supports the ball screw shaft 23. The ball nut 24 is in screw-engagement with the ball screw shaft 23. The ball nut 24 and the ball screw shaft 23 constitute conversion means for converting rotational force to thrust force. Accordingly, rotational force generated by the motor 25 is converted to thrust force by the ball nut 24 and the ball screw shaft 23, and the thrust force is transmitted to the injection apparatus 10. Further, the ball screw shaft 23 is connected to an output shaft 25a of the motor 25, and the ball nut 24 is connected to the injection apparatus 10 via a buffer member 36 such as a damper.

A sensor (deformation amount detection means) 28 is disposed adjacent to the spring 32. The sensor 28 senses the deforming position of the spring 32 to thereby detect a deformation amount x. The sensor 28 supplies a detection signal to an unillustrated controller. The holding member 31 functions as a stopper that restricts the stroke of the spring 32 and the displacement of the support member 33 in order to prevent the spring 32 from deforming (e.g., contacting) by an amount greater than a preset amount.

When the ball screw shaft 23 is rotated through drive of the motor 25, the ball nut 24 is advanced from a retracted position, so that the injection apparatus 10 is advanced. During this period, the spring 32 is prevented from deforming. For this purpose, a pre-load is applied to the spring 32 such that the spring 32 does not contract even when a compression force acts on the spring 32 due to friction resistance between the ball screw shaft 23 and the ball nut 24 or friction resistance of an unillustrated support mechanism that movably supports the injection apparatus 10.

Thus, the injection apparatus 10 reaches a nozzle touch position, and the injection nozzle 13 comes into contact with the stationary mold 15. Subsequently, when the motor 25 is further driven the support member 33 and the motor 25 are retracted (moved to the right in FIG. 3) against the urging force of the spring 32, because advancement of the injection apparatus 10 is prevented because the injection nozzle 13 is in contact with the stationary mold 15.

Accordingly, the spring 32 contracts by an amount corresponding to the retracted distance of the support member 33 and the motor 25, and the urging force of the spring 32 (corresponding to the nozzle touch force of the injection nozzle 13 against the mold 15) increases by an amount corresponding to the deformation amount x of the spring 32. Therefore, the nozzle touch force f can be detected through detection of the deformation amount x of the spring 32 by use of the sensor 28. In order to detect the nozzle touch force f, an unillustrated nozzle touch force detection means is provided in the controller. Upon receipt of a detection signal from the sensor 28, the nozzle touch force detection means detects the nozzle touch force f on the basis of the detection signal. When the deformation amount x reaches a preset value x1, as shown in FIG. 4, and thus a proper nozzle touch force f equal to a target nozzle touch force f1 is generated, unillustrated drive stop means provided in the controller stops the motor 25.

When the deformation amount x of the spring 32 reaches the preset value x1, the deformation of the spring 32 may be restricted by the holding member 31, so that the spring 32 does not deform further.

During this period, the buffer member 36 is prevented from displacing. For this purpose, a pre-load is applied to the buffer member 36 such that the buffer member 36 does not contract even when the nozzle touch force f is applied to the buffer member 36 as a compression force. When an additional force is applied to the injection apparatus 10, such as an external force due to impact caused by, for example, closing or opening of the molding apparatus 14 or injection of resin and the amount of movement of the injection apparatus 10 increases, the buffer member 36 displaces in order to absorb impact force.

Figure 5:
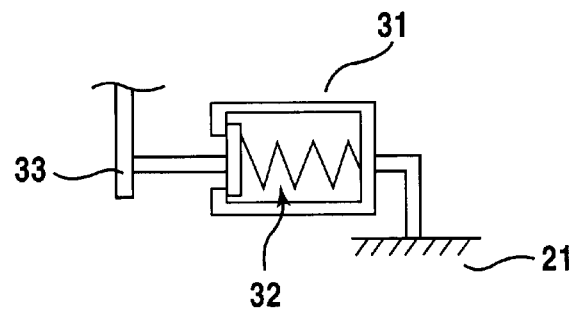
FIG. 5 illustrates one example of a tubular holding member and spring.

FIG. 5 illustrates one example of tubular holding member 31 and spring 32. In this example, spring 32 is a coiled wire disposed within tubular holding member 31. The length of the tubular holding member is shorter than the length of spring 32 in its relaxed state so that spring 32 is compressed within tubular holding member 32 to apply a preload to spring 32. Tubular holding member 31 may be positioned next to the support member 33 at a distance less than the length of the tubular holding member 31 so that the tubular holding member will abut support member 33 prior to spring 32 being fully compressed. In this example, spring 32 is prevented from deforming by an amount greater than a preset amount x1. The preset amount x1 of deformation may correspond to the proper nozzle touch force. Any forces applied to the nozzle greater than the proper nozzle touch force may be absorbed by buffer member 36.

Figure 6:
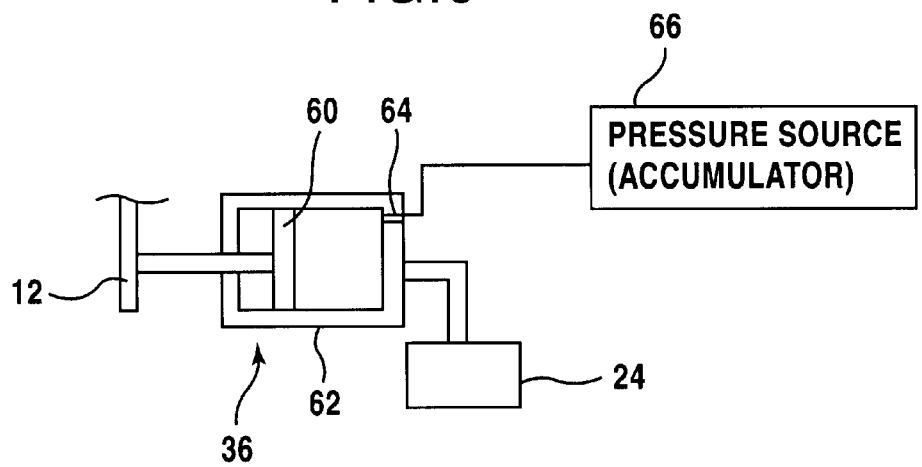
FIG. 6 illustrates one example of a buffer member.

FIG. 6 illustrates one example of buffer member 36. A piston 60 is disposed within a cylinder 62 containing gas or fluid to create pneumatic cylinder or a hydraulic cylinder, respectively. In this example, the piston 60 is connected to drive section 12 and the hydraulic cylinder is connected to nut 24. The gas or fluid within the cylinder 62 can exit piston 60 via outlet 64 to a pressure source/accumulator 66. The piston 60 moves to an equilibrium position where the pressure exerted against the piston from one side is substantially equal to the force exerted from drive section 12. By changing the initial pressure in the pressure source/accumulator 66, a spring constant associated with the buffer member 36 can be changed as desired.

Figure 4A:
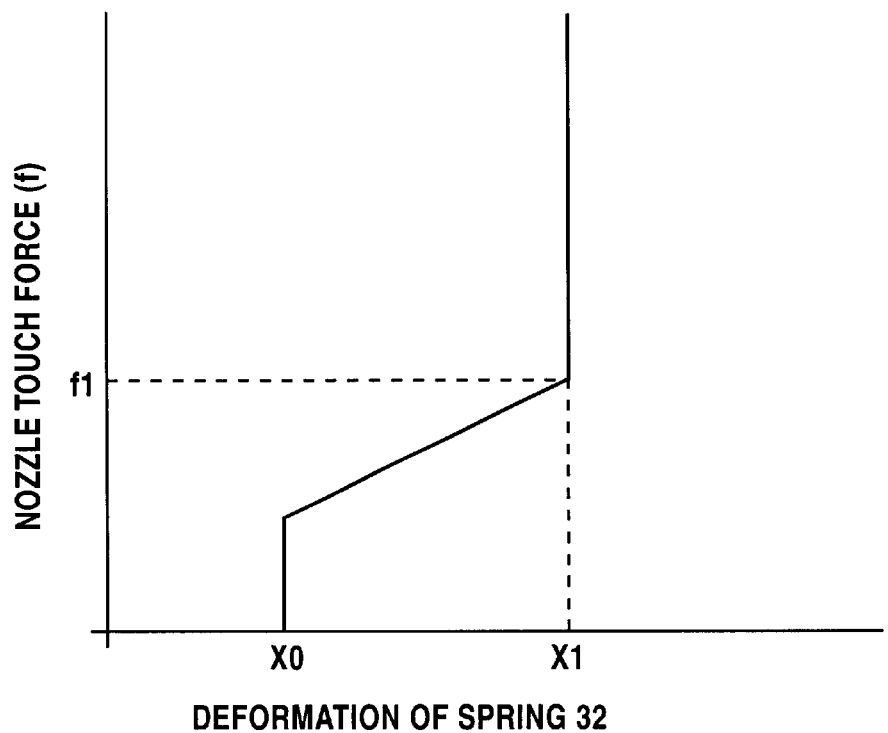
FIGS. 4A and 4B are nozzle touch characteristic charts.
Figure 4B:
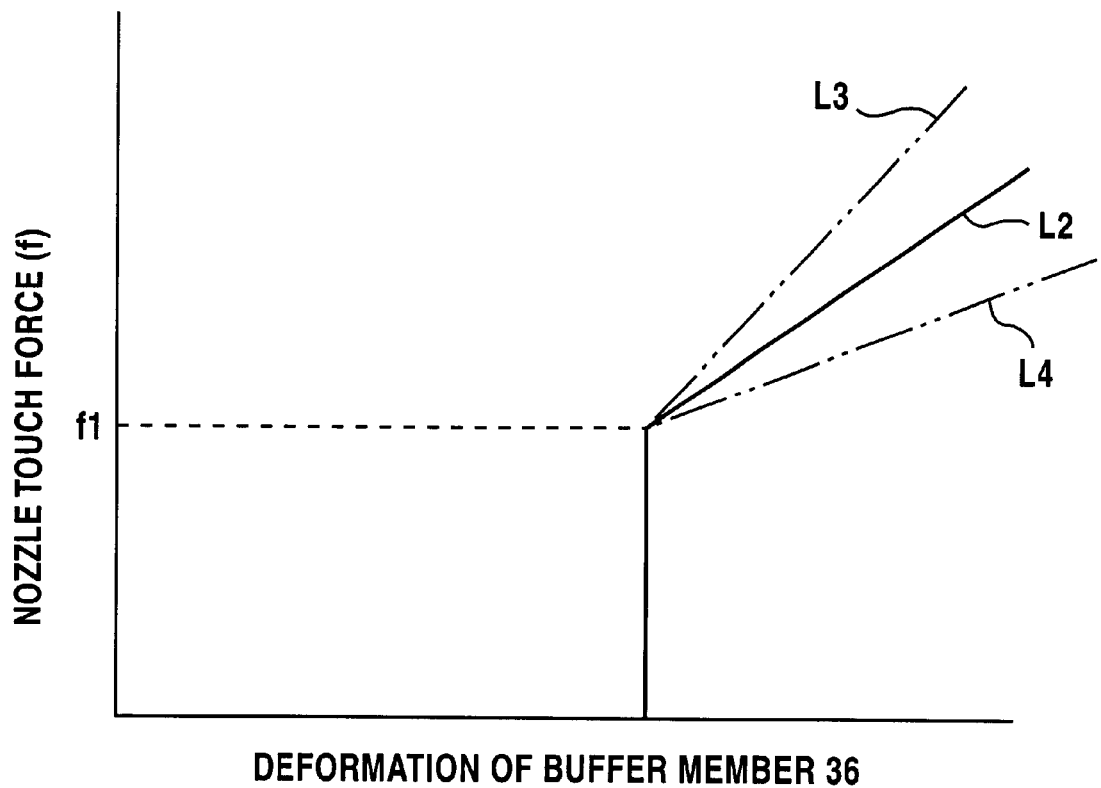

In FIG. 4A, line L1 represents an urging force generated due to deformation of spring 32. In FIG. 4B, line L2 represents a buffering force generated due to deformation of buffer member 36. Line L3 represents a maximum value and line L4 represents a minimum value of a range through which the inclination of line L2 can be changed (the rate of change of the buffering force corresponding to a spring constant associated with the buffering member).

In this example, the position of the tubular holding member 31 is set to contact support member 33 at position x1 which corresponds to a nozzle touch force of f1. Also, the preload applied to buffer member is set to the nozzle touch force of f1. In FIG. 4A, x0 represents a deformation of spring 32 corresponding to a preload applied to spring 32. In this example, the nozzle touch force f corresponds to deformations applied to spring 32 and buffer member 36. That is, when spring 32 is deformed past x0:

$$f=(x) \cdot k32+(y-y0) \cdot k36$$

where x is the deformation amount of spring 32, k32 is the spring constant of spring 32, y is the deformation amount of buffer member 36, y0 is the deformation amount corresponding to the preload applied to buffer member 36 and k36 is the spring constant associated with buffer member 36.

Alternatively, the nozzle touch force may be expressed as:

f=x·k32 when spring 32 is deformed between x0 and x1, and f=y·k36 when spring 32 is deformed to position x1. It is emphasized that the above expressions for the nozzle touch force are only exemplary; preloads do not need to be applied, nor does the stopping by stopping member 31 need to correspond to the preload applied to buffer member 36 (spring 32 and buffer member 36 can both be deformed at the same time, or the preload of the buffer member can exceed x·k32). However, it is emphasized that it is preferable to have the preload of the buffer member exceed the x·k32.

The nozzle touch force f can be adjusted through adjustment of the buffer member 36 performed in accordance with operation conditions. The inclination of line L2 can be changed as needed. FIG. 4B illustrates a maximum value L3 and a minimum value L4 between which the slope of line L2 may be varied.

For example, when the amount of movement of the injection apparatus 10 increases due to opening or closing of the mold apparatus 14, the buffering force increases accordingly, with the result that the nozzle touch force f increases by an amount corresponding to the increase in the buffering force fa. In order to solve this problem, when the amount of movement of the injection apparatus 10 is large, the buffering member 36 is adjusted so as to reduce the slope of line L2 to thereby prevent increase of the nozzle touch force f.

By contrast, when the hole diameter of the injection nozzle 13 is large, the pressure receipt area through which resin pressure is received increases, so that a large reaction force is applied to the injection nozzle 13 during injection. In this case, resin leaks from the clearance between the injection nozzle 13 and the stationary die 15 unless the buffering force fa is increased in accordance with the amount of movement of the injection apparatus 10. In this case, the buffer member 36 is adjusted to increase the slope of line L2.

Figure 7:
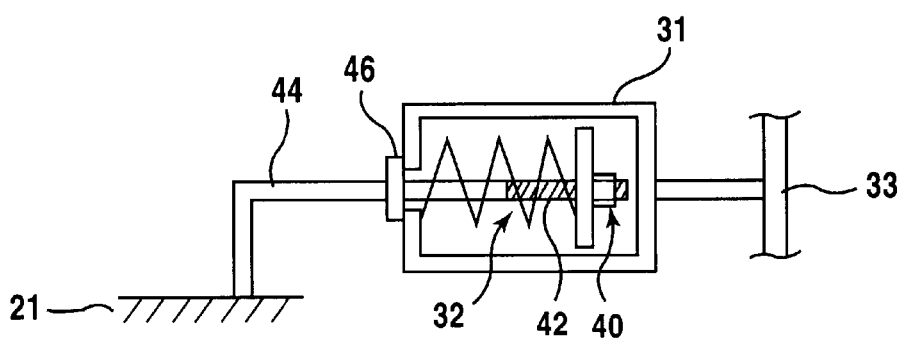
FIG. 7 illustrates another example of a tubular holding member and spring.

FIG. 7 illustrates another example of tubular holding member 31 and spring 32. If this example were to be utilized with the example described in connection with FIG. 3, the tubular holding member 31 and the spring 32 should be positioned on the left side of support member 33 in FIG. 33 to thereby exert a pulling force on support member 33 rather than a pushing force. In the example of FIG. 6, a spring 32 is disposed within tubular holding member 32. The spring extends from one end of the tubular holding member to a nut 40 positioned on a screw part 42 of fixing element 44. Fixing element 44 extends through tubular holding member 31 and is fixed to frame 21. A stopping member 46 is fixed onto fixing element 44 outside the tubular holding member 31.

The position of nut 40 on screw element 42 is adjustable, thereby adjusting the maximum distance the spring 32 can expand and thus the preload applied to spring 32.

It is emphasized that the structure of the spring 32 and buffering member 36 shown in FIGS. 5–7 are merely exemplary. Those skilled in the art will recognize that other types of springs, buffer members and other structure can be used in conjunction with this invention. The term "spring" as used in this application is considered to mean any elastic device which regains its original shape after being compressed or extended and should not be considered as merely a coil of wire. It is noted, therefore, that the example of the structure of buffer member 36 shown in FIG. 6 is also considered a spring.

Even when an external force is applied to the injection apparatus 10 with a resultant expansion or contraction of the spring 32, the amount of expansion or contraction of the spring 32 is restricted by the holding member 31 and absorbed by the buffer member 36. Accordingly, when an external force is applied to the injection apparatus 10 (e.g., due to moving a mold or an injecting of resin) the deformation amount x is unlikely to significantly change and the likelihood of improper control of the motor 25 is reduced. Thus, the nozzle touch force f can be accurately detected, and consequently, a proper nozzle touch force f can be generated.

In addition, since the sensor 28, the spring 32, and the holding member 31 are attached to the frame 21, these components are located outside an unillustrated casing of the injection apparatus. Therefore, maintenance and management of the injection molding machine can be facilitated.

The present invention is not limited to the above-described embodiment. This embodiment is only intended to set forth only one detailed example. Numerous modifications and variations of this example are possible in light of the spirit of the present invention, and they are not excluded from the scope of the present invention. For example, spring 32 is described as accumulating a nozzle touch force by compression. It is apparent however, that fixing spring 32 at a position leftward with respect to support 22 would allow accumulation of a nozzle touch force by expansion of spring 32. Further, many advantages of different aspects of the invention will be apparent to those skilled in the art. However, not all of these aspects are intended to be a required part of the invention as broadly defined. The scope and spirit of the invention are intended to be defined by the appended claims.

What is claimed is:

1. A method of operating an injection molding machine comprising:
   a) driving an injection nozzle against a mold with a driver;
   b) sensing a deformation of a first spring positioned between the driver and a frame;
   c) stopping the driving in step (a) in response to a deformation sensed in step (b); and
   d) absorbing shocks to the injection nozzle with a second spring positioned between the driver and the injection nozzle.

2. A nozzle touch apparatus for an injection molding machine comprising:
   a frame;
   an injection apparatus having an injection nozzle, said injection apparatus being disposed to be movable relative to said frame;
   moving means for moving said injection nozzle of said injection apparatus towards and away from a mold, said injection nozzle thus being movable to abut said mold with a nozzle touch force;
   first energy absorption means disposed between said moving means and said frame for absorbing mechanical energy relating to the nozzle touch force; and
   second energy absorption means disposed between said moving means and said injection apparatus for absorbing mechanical energy relating to the nozzle touch force.

3. A nozzle touch apparatus for an injection molding machine according to claim 2, wherein said first energy absorption means comprises urging means for generating an urging force for changing the nozzle touch force, said urging force changing with a compression of said urging means and restriction means for restricting a movement of said urging means.

4. A nozzle touch apparatus for an injection molding machine according to claim 2, further comprising:
   nozzle touch force detection means for detecting the nozzle touch force; and
   stop means for stopping said moving means when the nozzle touch force reaches a target value.

5. A nozzle touch apparatus for an injection molding machine according to claim 2, wherein said first energy absorption means includes a spring.

6. A nozzle touch apparatus for an injection molding machine according to claim 2, wherein said second absorption means includes one of a pneumatic cylinder and a hydraulic cylinder.

7. A nozzle touch apparatus for an injection molding machine according to claim 2, wherein said second energy absorption means is adjustable to change a spring constant associated with the second energy absorption means.

8. A nozzle touch apparatus for an injection molding machine according to claim 2, further comprising:

a housing in which said injection apparatus is positioned, wherein said first energy absorption means is disposed outside said housing.

9. A nozzle touch apparatus for an injection molding machine according to claim 2, wherein said moving means includes a motor for producing a rotating movement, and translating means for translating the rotating movement to a linear movement.

10. An injection molding machine, comprising:

injection nozzle;

a driver for driving said injection nozzle against a mold;

a frame;

a first spring, connected between said driver and said frame; and a second spring, connected between said driver and said injection nozzle.

11. The injection molding machine of claim 10, further comprising:

a housing in which at least said driver is positioned; wherein said first spring is positioned outside said housing.

12. The injection molding machine of claim 10, further comprising:

a stopper positioned to prevent movement of said first spring past a predetermined point.

13. The injection molding machine of claim 10, wherein said first spring is a coil and said second spring includes one of a pneumatic cylinder and hydraulic cylinder.

14. The injection molding machine of claim 10, wherein said second spring is associated with a spring constant which is adjustable.

15. The injection molding machine of claim 10, further comprising:

a sensor, positioned to detect a deformation amount of said first spring to thereby detect a force from a mold upon said nozzle.

16. The injection molding machine of claim 15, wherein the deformation amount of the first spring is an amount of compression.

17. The injection molding machine of claim 15, further comprising:

drive stop means for stopping the driver to achieve a target nozzle touch force in response to an output by said sensor.

18. The injection molding machine of claim 10, wherein a preload is applied to said first and second springs.

19. The injection molding machine of claim 18, wherein at least the preload applied to the first spring is adjustable.

20. The injection molding machine of claim 14, wherein said second spring includes one of a pneumatic cylinder and a hydraulic cylinder, wherein pressure within the cylinder is adjustable to adjust the spring constant associated with said second spring.

21. An injection molding machine comprising:

an injection nozzle;

a driver for driving said injection nozzle against a mold;

a frame;

a spring, connected between said driver and said frame; and a stopper, positioned to prevent said spring from deforming past a predetermined amount.

22. The injection molding machine of claim 21, wherein said driver includes a support said stopper includes a tubular member connected to said frame, said spring positioned within said tubular member to be compressed by one end of the tubular member and an extension of said support, and said tubular member abuts said support to prevent compression of said spring past a predetermined amount.

* * * * *